July 26, 1955 W. R. BREUNINGER Re. 24,044

BATTER BOARD

Original Filed April 28, 1950

INVENTOR.
WILLIAM R. BREUNINGER
BY

McMorrow, Berman + Davidson
ATTORNEYS

United States Patent Office

Re. 24,044

Reissued July 26, 1955

24,044

BATTER BOARD

William R. Breuninger, Malvern, Pa.

Original No. 2,562,597, dated July 31, 1951, Serial No. 158,717, April 28, 1950. Application for reissue July 17, 1953, Serial No. 368,849

4 Claims. (Cl. 33—86)

Matter enclosed in heavy brackets [ ] appears in the original patent but forms no part of this reissue specification; matter printed in italics indicates the additions made by reissue.

My invention relates to improvements in batter boards.

In building construction work batter boards are erected at the corners of the foundation or lot over which horizontal lines are stretched to define the shape of the building, positions of walls and the like. The lines are arranged to define perfectly square corners and a true horizontal plane or level. These batter boards are generally constructed by nailing wooden strips to upright wooden posts which are driven into the ground near the corners of the building. This construction is not satisfactory, since nails must be removed in order to adjust the batter board and the joints between the posts and batter boards frequently become loose and unreliable. Accordingly, a primary object of this invention is to provide improved batter boards including means for readily adjusting them vertically upon the posts carrying the batter boards, the construction being such that the joints between the batter boards and posts are subject to substantially no damaging wear, so that the boards and posts can be used substantially indefinitely.

A further object is to provide batter boards and posts which are formed of metal, and which are highly simplified, compact and extremely sturdy and durable in construction.

A still further object of the invention is to provide batter boards and posts of the above-mentioned character which are inexpensive to manufacture, very easy to manipulate and which may be readily disassembled so that the various parts may be carried in a highly compact and convenient manner.

Other objects and advantages of the invention will be apparent during the course of the following description.

In the accompanying drawings forming a part of this application, and in which like numerals are employed to designate like parts throughout the same:

Figure 1:
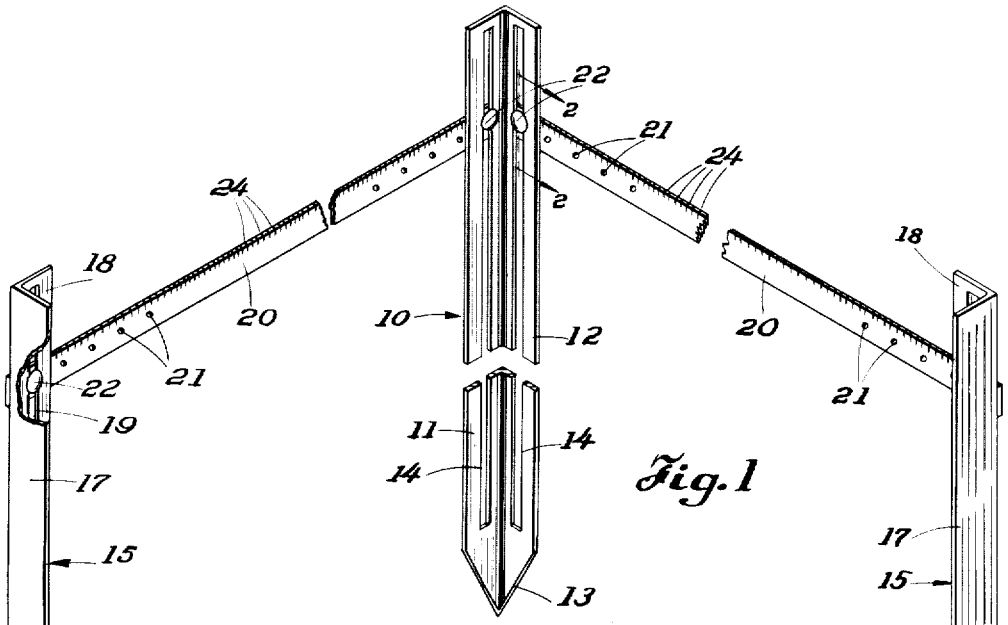
Figure 1 is a perspective view of batter boards and posts embodying my invention, parts broken away.
Figure 2:
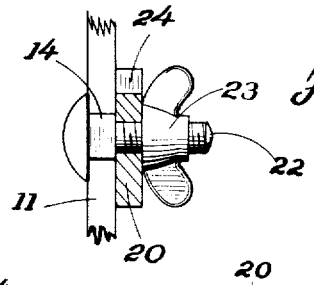
Figure 2 is an enlarged, fragmentary, vertical, sectional view taken on line 2—2 of Figure 1.
Figure 3:
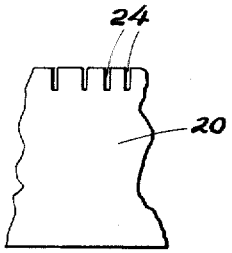
Figure 3 is an enlarged, fragmentary, side elevational view of a batter board removed.

In the drawings, where, for the purpose of illustration, is shown a preferred embodiment of my invention, the numeral 10 designates an elongated, straight, vertical corner post, preferably formed from a unitary section of angle iron, or the like, and including a pair of flat, integrally connected webs 11 and 12 disposed at right angles to each other and defining a square corner, as shown. The bottom end of the post 10 is preferably beveled, as at 13, to facilitate driving the post into the ground. The webs 11 and 12 are provided with elongated, longitudinal, straight, parallel slots 14 extending throughout substantially the entire length of the post 10 and spaced from the corner of the post, as shown.

End posts 15 are provided, and the posts 15 are likewise preferably formed from unitary, straight sections of angle iron, and beveled at their bottom ends, as at 16, to facilitate driving the end posts into the ground. The end posts 15 are preferably of the same length as the corner post 10, and the end posts include integrally connected, flat webs 17 and 18 arranged at right angles to each other, as shown. The webs 18 of the end posts 15 are arranged in alignment with the webs 11 and 12 in use, Figure 1, and the webs 18 are provided with elongated, straight, narrow, vertical slots 19 extending throughout substantially the entire length of the end posts and parallel with the slots 14 of the corner post.

Separate, elongated, straight, horizontal batter boards or strips 20 are positioned adjacent to the outer faces of the webs 11, 12 and 18, and these batter boards are preferably formed from unitary sections of strap iron, or the like, and are heavy enough so that they will not sag or deflect appreciably between the corner and end posts in assembly. The batter boards 20 are preferably provided near their opposite ends with longitudinally spaced, adjusting openings 21, any of which are adapted to receive bolts 22, or the like, which extend through the adjacent slots 14 and 19 of the corner and end posts. Wing nuts 23 are mounted upon the bolts 22 to facilitate adjusting the batter boards 20 vertically upon the posts 10 and 15. The batter boards 20 are disposed edgewise with their opposite, flat faces arranged vertically in assembly, and the inner faces of the batter boards contact the adjacent flat flanges 11, 12 and 18, as shown. The batter boards are provided in their top longitudinal edges with a plurality of longitudinally equidistantly spaced notches 24, and the batter boards are thus notched throughout substantially their entire length, as shown. The notches 24 are preferably approximately 1/16 of an inch wide and 1/8 of an inch deep, although these dimensions may vary, and the notches are preferably spaced approximately 1/4 of an inch apart, and this spacing may likewise be varied, if desired.

Figure 4:
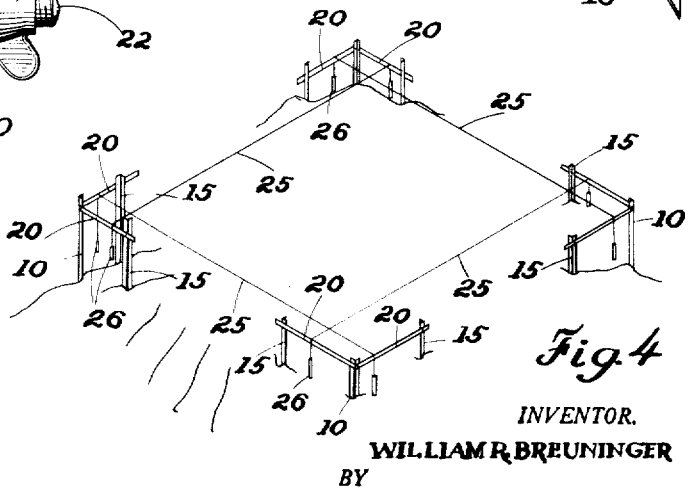
Figure 4 is a perspective view, partly diagrammatic, and illustrating the use of batter boards in building construction work.

In use, Figure 4, before starting to construct a building or the like, sets or pairs of batter boards 20 and the posts carrying them are positioned near the corners of the building, and the posts 10 and 15 are driven into the ground. Lines 25 having weights 26 secured to their opposite ends are hung over the batter boards 20 of the corner sets, and the lines are positioned in selected notches 24 for defining perfectly square corners at the intersections or crossing points of the lines 25. The weights 26 maintain the lines 25 taut, and the lines may define the shape of the building to be erected and the positions of walls, curbing and the like. The batter boards 20 are readily adjustable vertically upon the posts carrying them by manipulating the wing nuts 23 and associated elements. By adjusting the batter boards vertically, all of the lines 25 may be arranged perfectly level with the lines defining a horizontal level plane.

After the batter boards have served their purpose in the construction of the building, they may be detached from their posts 10 and 15 and folded into a highly compact arrangement for transporting them or for storage purposes. Since the posts and batter boards are formed of metal, they are extremely strong and subject to substantially no damaging wear. The batter boards may be repeatedly used, and they should last substantially indefinitely. The posts 10 and 15, as well as the batter boards, are formed from standard metal stock, as previously stated, and the construction is very cheap.

It is to be understood that the form of the invention herewith shown and described is to be taken as a preferred example of the same, and that various changes in shape, size and arrangement of parts may be resorted to without departing from the spirit of the invention or the scope of the subjoined claims.

Having thus described my invention, I claim:

1. A structure for use in the erection of corner supports for building foundations comprising a corner post of right angular configuration in cross section and having connected webs, said corner post having a lower end adapted to be driven into the ground with the webs *parallel to* [defining the juncture of] a pair of the intersecting side lines of the foundation, end posts adapted to be vertically driven into the ground [parallel with] and spaced from each web, one end post being *in alignment with one web of the corner post and the other post being in alignment with the other web* [disposed along one side line in alignment with the corresponding web of the corner post and the other end post being disposed along the other side line of the foundation and in alignment with the other web] batter boards disposed in horizontal planes and connecting the end posts with the [aligned] webs of the corner post, said batter boards being vertically adjustable for disposition in various common horizontal planes and having means formed in predetermined fashion on their upper edges for the reception of lines which intersect at an angle diametrically opposed to the angular juncture of the webs and which form with the webs a square corner.

2. A structure for use in the erection of corner supports for building foundations, comprising a corner post of right angular configuration in cross section and having connected webs, said corner post having a lower end adapted to be driven into the ground with the webs *parallel to* [defining the juncture of] a pair of the intersecting side lines of the foundation, end posts adapted to be vertically driven into the ground *parallel with* and spaced from each web, one end post being *in alignment with one of the corner posts and the other end post being in alignment with the other web* [disposed along one side line in alignment with the corresponding web of the corner post and the other end post being disposed along the other side line of the foundation and in alignment with the other web,] batter boards disposed in horizontal planes and connecting the end posts with the [aligned] webs of the corner post, said batter boards being vertically adjustable for disposition in various common horizontal planes and having means formed in predetermined fashion on their upper edges for the reception of lines which intersect at an angle diametrically opposed to the angular juncture of the webs and which form with the webs a square corner, said webs and said end posts being formed with axial slots and said ends of the batter board being provided with longitudinal spaced transverse apertures for the selective reception of fasteners slidably disposed in the slots whereby the batter boards are vertically adjustable and the distance between the webs and the end posts is variable.

*3. A folding batter board assembly for use in the erection of building foundations comprising a corner post having at least two sides of right angular configuration to each other, said corner post having a lower end adapted to be driven into the ground with the sides parallel to a pair of the intersecting side lines of the foundation, end posts adapted to be vertically driven into the ground and spaced from each of said sides, one end post being disposed along one side line in alignment with the corresponding side of the corner post and the other end post being disposed along the other side line of the foundation and in alignment with the other side of the post, batter boards joining the corner posts to each of the end posts, and a pivotal and slidable connection between each of the batter boards, the corner post and the end posts whereby, when the connections are loosened, the batter boards are vertically adjustable for disposition in various horizontal planes in operative position and foldable into compact arrangement for storage, and whereby, when the connections are tightened, the batter boards and the posts form a rigid unitary right angled structure.*

*4. A folding batter board assembly for use with the erection of building foundations comprising a corner post having at least two sides at right angles to each other, said corner post having a lower end adapted to be driven into the ground with the sides parallel to a pair of the intersecting side lines of the foundation, end posts adapted to be vertically driven into the ground and spaced from each of said sides, one end post being in alignment with the one side of the corner post and the other end post being in alignment with the other side of the post, batter boards disposed in horizontal planes and connecting the end posts with the aligned sides of the corner post, said batter boards being being vertically and slidably adjustable for disposition in various common horizontal planes and having means formed in predetermined fashion on their upper edges for the reception of lines which intersect at an angle diametrically opposed to the angular juncture of the sides and which form with the sides a square corner, and an adjustable clamping bracket connecting the batter board to the corner post and the end post whereby the batter boards are adjustable with respect to said posts, and notches formed on the upper edges of said batter boards for the reception of lines which intersect at an angle diametrically opposed to the angular juncture of the sides.*

References Cited in the file of this patent or the original patent

UNITED STATES PATENTS

| | | |
|---|---|---|
| 253,490 | Allen | Feb. 14, 1882 |
| 429,977 | Thomas | June 10, 1890 |
| 1,245,632 | Straub | Nov. 6, 1917 |
| 1,336,004 | Victoria | Apr. 6, 1920 |
| 1,609,912 | Mazeau | Dec. 7, 1926 |
| 1,776,314 | Fenno | Sept. 23, 1930 |